March 25, 1969  H. FROITZHEIM  3,434,559
INSTRUMENT PANEL OF VEHICLES, ESPECIALLY
COMMERCIAL-TYPE VEHICLES
Filed Aug. 25, 1966
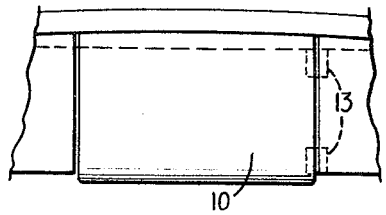
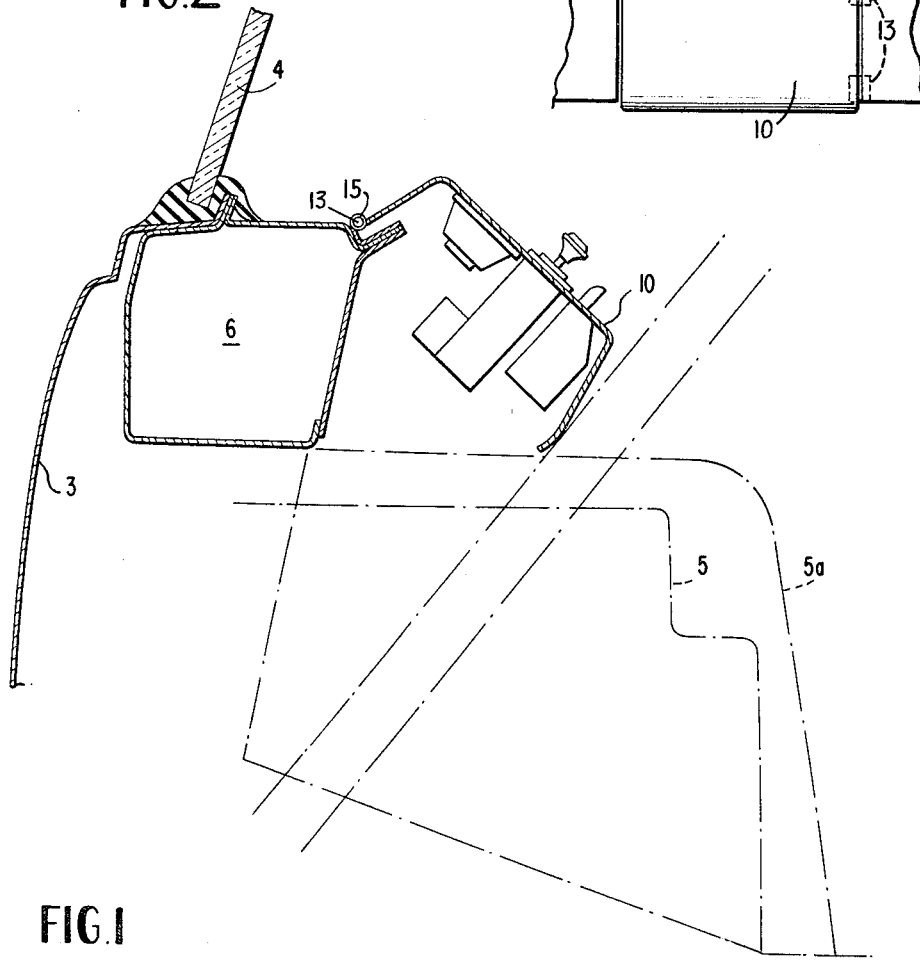
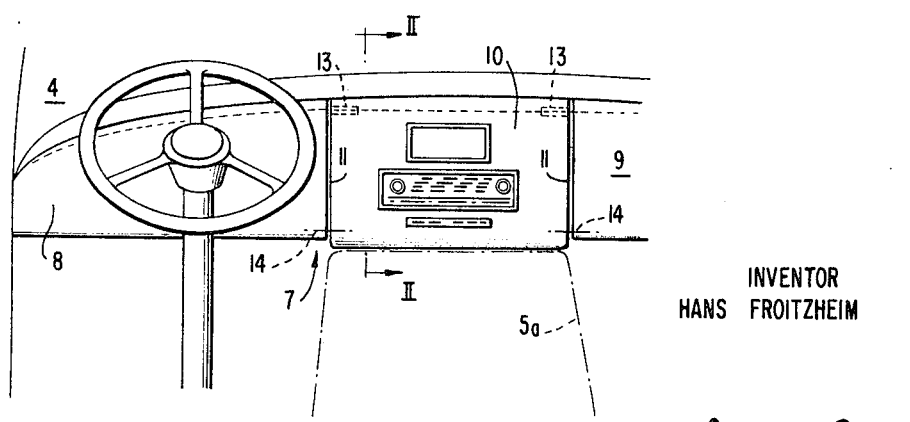
INVENTOR
HANS FROITZHEIM
BY *Dicke & Craig*
ATTORNEYS

# United States Patent Office 3,434,559
Patented Mar. 25, 1969

3,434,559
INSTRUMENT PANEL OF VEHICLES, ESPECIALLY COMMERCIAL-TYPE VEHICLES
Hans Froitzheim, Sindelfingen, Wurttemberg, Germany, assignor to Daimler-Benz Aktiengesellschaft, Stuttgart-Unterturkheim, Germany
Filed Aug. 25, 1966, Ser. No. 574,992
Claims priority, application Germany, Aug. 27, 1965,
D 48,066
Int. Cl. B62d 25/14; B60k 37/00
U.S. Cl. 180—90                                    15 Claims

ABSTRACT OF THE DISCLOSURE

An instrument panel for commercial vehicles of the type having a cab mounted over the front wheels or of short-hood construction, such that the engine, drive train and the cover therefor extend into the driver's compartment, wherein at least that portion of the instrument panel which is disposed above the engine cover is mounted pivotably upon a fixed vehicle part, so that it may be swung away from the engine cover to render the engine and drive train readily accessible from within the driver's compartment.

---

The present invention relates to an instrument panel of vehicles, especially of commercial motor vehicles of the type having a cab mounted over the front wheel or of short hood construction, and above all serves to render readily accessible for purposes of repair and maintenance, the engine and other aggregates and units which are arranged below the instrument panel.

According to the present invention, the instrument panel is provided with a pivotal and/or removable center section, especially of a width corresponding approximately to the width of the engine hood projecting into the driver compartment or cab.

Accordingly, it is an object of the present invention to provide an instrument panel, especially for commercial motor vehicles of the type described above which eliminates the shortcoming as regards ease of engine accessibility encountered with the prior art constructions.

Another object of the present invention resides in an instrument panel for commercial-type motor vehicles which permits ready accessibility to the engine and auxiliary units normally disposed within and below the area of the instrument panel underneath the engine hood projecting into the driver compartment.

Still another object of the present invention resides in a multipartite instrument panel for the driver cab of commercial-type motor vehicles which is simple in construction and is subdivided in accordance with pragmatic requirements thereof.

A further object of the present invention resides in an instrument panel for commercial-type motor vehicles which is so constructed and arranged that a pivotal and/or removable section is used for only such instruments, controls or apparatus of the instrument panel as can be readily and detachably connected, for example, by plug-in type connections.

These and further objects, features, and advantages of the present invention will become more obvious from the following description when taken in connection with the accompanying drawing which shows, for purposes of illustration only, one embodiment in accordance with the present invention, and wherein:

FIGURE 1 is a partial elevational view on the instrument panel of a commercial-type vehicle, broken off on one side thereof, FIGURE 2 is a cross-sectional view on an enlarged scale, taken along line II—II of FIGURE 1, indicating schematically in dash-and-dot lines the engine, the engine hood, and the steering column, and FIGURE 3 is an elevational view of an alternative embodiment of the instrument panel according to the present invention.

Referring now to the drawing wherein like reference numerals are used throughout the two views to designate like parts, the driver cab in the forward section of a commercial-type motor vehicle of conventional forward chassis control construction is limited in the forward direction by the front wall 3 and the windshield 4. The forward lower portion of the driver cab is subdivided into two halves by the driving engine 5 arranged relatively high and by the further driving parts disposed to the rear of the engine 5, such as the clutch and the transmission (not shown), namely, into one half for the driver and the other half for the assistant driver.

A channel-like air box 6 is arranged below the windshield 4 in a conventional, known manner which extends over the entire vehicle width. Mounted in front of this air box 6 in the direction toward the vehicle interior of the cab is an instrument panel 7 which extends over substantially the same width as the channel-like air box 6.

The illustrated instrument panel 7 is constructed of thre parts: the part or section 8 disposed in front of the steering wheel serves as instrument and shifting as well as switching panel for the driver. To the right of the driver is located the engine hood 5a. The portion or section 9 of the instrument panel 7 in front of the assistant driver may serve, for example, for the accommodation of a glove compartment.

In order to achieve accessibility to the engine 5, the engine hood 5a is arranged so as to be removable in the rearward direction of the vehicle. To the same end, the center section 10 of the instrument panel 7 is constructed as pivotal and/or removable, dish-shaped cover open in the downward direction whose outer surfaces are in alignment with the adjacent surfaces of the instrument panel sections 8 and 9. The lateral rims 11 of the center section 10 of the instrument panel 7 may be provided with resilient sealing strips, with the aid of which the cover 10 passes over, in the closed condition, into the parts or sections 8 and 9 of the instrument panel 7 without air gaps.

The center section 10 of the instrument panel 7 is provided primarily for the installation of radio equipment whose cables may be equipped with plug-type connectors. In order to facilitate accessibility to the engine 5 from above, the center section 10 is pivotally secured at its forward edge by means of hinges 15, which accommodate therein bolts 13, at the channel-like air box 6. In this manner, the center part 10 may be simply pivoted upwardly as soon as two lateral slidable latch members 14 of conventional construction are displaced into the free or open position.

The hinges may be constructed as conventional, detachable plug-type hinges. However, a snap-button-type arrangement may also be used in lieu thereof.

After the upward pivoting and/or removing of the center section 10, which may be carried out rapidly, and with the hood 5a opened, the engine 5 and the units otherwise disposed within this area are readily accessible from above for purposes of maintenance and repair.

I claim:

1. An instrument panel for vehicles, especially commercial-type motor vehicles having a driver cab and a drive unit, including a cover therefor, projecting at least in part into said driver cab in the region of the central longitudinal axis of the vehicle, characterized by a discrete multipartite instrument panel spaced vertically above said drive unit and cover and extending substantially over the entire width of the driver cab in the transverse direction of the vehicle, having a center instrument panel section, the outer surfaces of said center instrument panel section being substantially continuous, in the normal position thereof, with the corresponding surfaces of the adjoining sections of the instrument panel, and means for mounting said center instrument panel section to enable displacement thereof from its normal position to gain access from above to the drive unit parts disposed therebelow.

2. An instrument panel according to claim 1, wherein said mounting means includes pivot means to enable upward pivotal movement of said center instrument panel section.

3. An instrument panel according to claim 1, wherein said mounting means includes detachable means to enable removal of said center section.

4. An instrument panel according to claim 1, wherein said mounting means includes disconnectable pivotal means enabling pivotal movement of said center section and removal thereof.

5. An instrument panel according to claim, 1 further comprising an engine hood, said center section substantially corresponding in its width to the width of said engine hood.

6. An instrument panel according to claim 5, wherein said mounting means includes disconnectable pivotal means enabling pivotal movement of said center section and removal thereof.

7. An instrument panel according to claim 1, wherein said center section is constructed as dish-shaped cover means open in the downward direction, said mounting means including hinge means for pivotally securing said cover means at the forward edge thereof at a relatively fixed part of the vehicle.

8. An instrument panel according to claim 7, wherein said relatively fixed part is a hollow box-like air-channel member.

9. An instrument panel according to claim 1, wherein said center section is pivotally connected with one of the two adjacent instrument panel sections.

10. An instrument panel according to claim 1, wherein the lateral edges of the center section are provided with sealing strip means.

11. An instrument panel according to claim 1, wherein the outer surfaces of said center section are in substantial alignment with the corresponding surfaces of the two adjoining sections of the instrument panel.

12. An instrument panel according to claim 1, wherein said center section is constructed as dish-shaped cover means open in the downward direction, said mounting means including hinge means for pivotally securing said cover means at the forward edge thereof at a relatively fixed part of the vehicle.

13. An instrument panel according to claim 12, wherein said hinge means are plug-type detachable hinges.

14. An instrument panel according to claim 1, wherein said center section is pivotally connected with one of the two adjacent instrument panel sections.

15. An instrument panel according to claim 1, wherein the lateral edges of the center section are provided with sealing strip means.

References Cited

UNITED STATES PATENTS

| 2,667,230 | 1/1954 | Duff et al. | 180—89 X |
| 2,976,947 | 3/1961 | Cruthis et al. | 180—90 |
| 3,194,338 | 7/1965 | Rutman et al. | 180—90 |

A. HARRY LEVY, *Primary Examiner.*

U.S. Cl. X.R.

296—70